(12) United States Patent
Park et al.

(10) Patent No.: US 10,634,945 B2
(45) Date of Patent: Apr. 28, 2020

(54) REFLECTIVE LIQUID CRYSTAL DISPLAY

(71) Applicant: Samsung Display Co., Ltd., Yongin-si, Gyeonggi-do (KR)

(72) Inventors: Seung Hyun Park, Seoul (KR); Jun Ho Song, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 78 days.

(21) Appl. No.: 15/678,878

(22) Filed: Aug. 16, 2017

(65) Prior Publication Data
US 2018/0052364 A1 Feb. 22, 2018

(30) Foreign Application Priority Data

Aug. 18, 2016 (KR) .................. 10-2016-0105111

(51) Int. Cl.
| G02F 1/1335 | (2006.01) |
| G02F 1/1362 | (2006.01) |
| G02F 1/13357 | (2006.01) |
| G02F 1/1343 | (2006.01) |
| G02F 1/1347 | (2006.01) |
| G02F 1/136 | (2006.01) |

(52) U.S. Cl.
CPC ...... *G02F 1/133553* (2013.01); *G02F 1/1336* (2013.01); *G02F 1/1347* (2013.01); *G02F 1/134309* (2013.01); *G02F 1/136227* (2013.01); *G02F 1/136286* (2013.01); *G02F 2001/13606* (2013.01); *G02F 2001/136222* (2013.01)

(58) Field of Classification Search
CPC ......... G02F 1/133553; G02F 1/134309; G02F 1/1336; G02F 1/136227; G02F 1/1347; G02F 1/136286; G02F 2001/136222; G02F 2001/13606
See application file for complete search history.

(56) References Cited

U.S. PATENT DOCUMENTS

| 9,091,877 B2 | 7/2015 | Tamaki et al. | |
| 2006/0001803 A1* | 1/2006 | Park | G02F 1/13439 349/113 |
| 2009/0152555 A1* | 6/2009 | Park | G02F 1/133555 257/59 |

(Continued)

FOREIGN PATENT DOCUMENTS

| JP | 2005-018008 A | 1/2005 |
| KR | 10-0806891 B1 | 2/2008 |
| KR | 10-1022807 B1 | 3/2011 |

*Primary Examiner* — Huyen L Ngo
(74) *Attorney, Agent, or Firm* — Innovation Counsel LLP

(57) ABSTRACT

A liquid crystal display of an exemplary embodiment includes: first and second gate line disposed on a substrate and extending in a first direction; first and second data line disposed on the substrate; a first transistor connected to the first gate line and the first data line; a second transistor connected to the second gate line and the second data line; a first pixel electrode overlapping the first transistor and the first gate line; a second pixel electrode overlapping the second transistor and the second gate line; a reflective layer disposed between the first gate line and the first data line, the second data line and the first pixel electrode and extending in the first direction, the first pixel electrode is disposed at a next row of the second pixel electrode in the second direction, and the first transistor is connected to the second pixel electrode.

17 Claims, 5 Drawing Sheets

(56) References Cited

U.S. PATENT DOCUMENTS

| | | | |
|---|---|---|---|
| 2009/0225260 A1* | 9/2009 | Adachi | G02F 1/133707 349/114 |
| 2011/0043498 A1* | 2/2011 | Tsubata | G02F 1/13624 345/204 |
| 2012/0098812 A1* | 4/2012 | Bae | G02B 26/005 345/211 |
| 2014/0098144 A1* | 4/2014 | Shin | G09G 3/2003 345/694 |
| 2015/0042693 A1* | 2/2015 | Hirata | G09G 3/3659 345/690 |
| 2015/0179682 A1* | 6/2015 | Hosoya | G02F 1/1362 257/59 |
| 2015/0346549 A1* | 12/2015 | Fang | G02F 1/133555 359/247 |
| 2016/0013259 A1* | 1/2016 | Yang | H01L 27/3272 257/40 |
| 2016/0147122 A1* | 5/2016 | Hwang | G02F 1/133512 257/72 |
| 2016/0202520 A1* | 7/2016 | Hong | G02F 1/13394 349/43 |
| 2016/0300541 A1* | 10/2016 | Cheng | G02F 1/134309 |
| 2017/0010503 A1* | 1/2017 | Song | G02F 1/133514 |
| 2017/0038644 A1* | 2/2017 | Song | G02F 1/133553 |

* cited by examiner

REFLECTIVE LIQUID CRYSTAL DISPLAY

CROSS-REFERENCE TO RELATED APPLICATION

This application claims priority to and the benefit of Korean Patent Application No. 10-2016-0105111 filed in the Korean Intellectual Property Office on Aug. 18, 2016, the entire contents of which are incorporated herein by reference.

BACKGROUND

(a) Technical Field

The present disclosure relates to a liquid crystal display, and in detail, relates to a reflective liquid crystal display.

(b) Description of the Related Art

A liquid crystal display (LCD) is one of the most commonly used display devices. The liquid crystal display applies an electric field to a liquid crystal panel including a liquid crystal layer to change an arrangement of liquid crystal molecules, thereby displaying an image by controlling a transmittance of light.

The liquid crystal display is non-emissive such that the liquid crystal display includes a backlight unit to provide the light to the liquid crystal panel at a rear surface of the liquid crystal panel. The liquid crystal display may be referred to as a transmissive mode liquid crystal display.

Further, the liquid crystal display includes a reflective mode liquid crystal display reflecting external light, including natural light, to a reflective layer of the liquid crystal panel to display the image without the backlight unit.

The reflective mode liquid crystal display does not include the backlight unit providing the light such that research to increase reflectivity is underway.

The above information disclosed in this Background section is only for enhancement of understanding of the background of the inventive concept and therefore it may contain information that does not form the prior art that is already known in this country to a person of ordinary skill in the art.

SUMMARY

Exemplary embodiments provides a reflective liquid crystal display improving reflectivity and preventing distortion of a voltage applied to a pixel electrode.

A liquid crystal display according to an exemplary embodiment of the present inventive concept includes: a first substrate; a first gate line disposed on the first substrate and extending in a first direction; a second gate line disposed on the first substrate, extending in the first direction, and disposed above the first gate line in a second direction on a plane, the second direction perpendicular to the first direction; a first data line and a second data line disposed on the first substrate, insulated from the first gate line and the second gate line, the first data line and the second data line disposed to be close to each other; a first transistor connected to the first gate line and the first data line; a second transistor connected to the second gate line and the second data line; a first pixel electrode overlapping the first transistor and the first gate line; a second pixel electrode overlapping the second transistor and the second gate line; and a first reflective layer disposed between the first gate line and the first data line, disposed between the second data line and the first pixel electrode, and extending in the first direction, wherein the first pixel electrode is disposed under the second pixel electrode in the second direction on a plane, and the first transistor is connected to the second pixel electrode.

The first reflective layer may cover the entire first gate line and the first transistor and may cover the entire width of a portion of the first data line and the entire width of a portion of the second data line.

A second reflective layer disposed between the second gate line and the first data line, disposed between the second data line and the second pixel electrode extending in the first direction, may be further included.

The second reflective layer may cover the entire second gate line and the second transistor, and may cover the entire width of a portion of the first data line and the entire width of a portion of the second data line.

A third gate line disposed on the first substrate and disposed under the first gate line in the second direction on a plane; a third transistor connected to the third gate line and the second data line; and a third pixel electrode overlapping the third gate line and the third transistor and disposed under the first pixel electrode in the second direction on a plane, may be further included.

The first pixel electrode may be connected to the third transistor.

A third reflective layer disposed between the third gate line and the first data line, disposed between the second data line and the third pixel electrode extending in the first direction, may be further included.

The third reflective layer may cover the entire third gate line and the third transistor, and may cover the entire width of a portion of the first data line and the entire width of a portion of the second data line.

A boundary of the first pixel electrode and the second pixel electrode may overlap the first reflective layer, and a boundary of the first pixel electrode and the third pixel electrode may overlap the third reflective layer.

A first storage electrode line disposed on the first substrate and disposed between the first gate line and the second gate line on a plane; and a third storage electrode line disposed on the first substrate and disposed between the first gate line and the third gate line on a plane, may be further included.

The first storage electrode line may include a first storage electrode protruded in the second direction on a plane, and the third storage electrode line may include a third storage electrode protruded in the second direction on a plane.

A drain terminal of the first transistor may include a first storage capacitive plate overlapping the first storage electrode, and the drain terminal of the third transistor may include a third storage capacitive plate overlapping the third storage electrode.

The first pixel electrode may be connected to the third storage capacitive plate, and the second pixel electrode may be connected to the first storage capacitive plate.

The boundary of the first reflective layer and the second reflective layer may overlap the first storage capacitive plate, and the boundary of the first reflective layer and the third reflective layer may overlap the third storage capacitive plate.

The first reflective layer, the second reflective layer, the third reflective layer, the first storage capacitive plate, and the third storage capacitive plate may include the same material.

A first color filter disposed between the first pixel electrode and the first reflective layer; and a second color filter disposed between the second pixel electrode and the first reflective layer, may be further included, and the first color filter and the second color filter may represent different colors from each other.

The first substrate may include a display area displaying an image and a peripheral area enclosing the display area, the first reflective layer, the second reflective layer, and the third reflective layer may be disposed at the display area and the peripheral area, and the first reflective layer, the second reflective layer, and the third reflective layer may receive a ground voltage or a common voltage at the peripheral area.

According to the exemplary embodiments, the reflectivity is improved in the reflective liquid crystal display and the distortion of the voltage applied to the pixel electrode may be prevented.

DETAILED DESCRIPTION OF THE EMBODIMENTS

Figure 1:
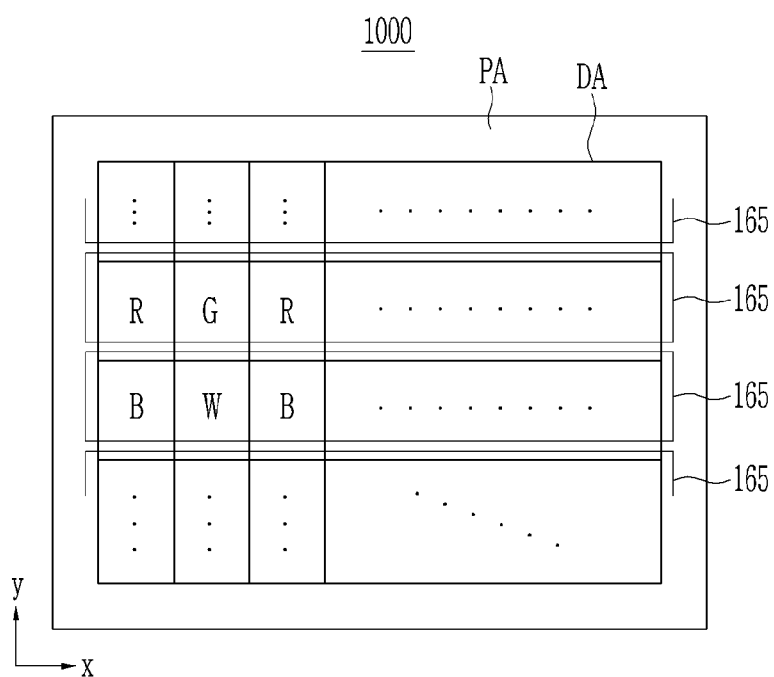
FIG. 1 is a view schematically showing a liquid crystal display according to an exemplary embodiment of the present inventive concept.

The present inventive concept will be described more fully hereinafter with reference to the accompanying drawings, in which exemplary embodiments of the invention are shown. As those skilled in the art would realize, the described embodiments may be modified in various different ways, all without departing from the spirit or scope of the present inventive concept.

In order to clearly explain the present inventive concept, portions that are not directly related to the present inventive concept are omitted, and the same reference numerals are attached to the same or similar constituent elements through the entire specification.

In addition, the size and thickness of each configuration shown in the drawings are arbitrarily shown for better understanding and ease of description, but the present inventive concept is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

FIG. 1 is a view schematically showing a liquid crystal display according to an exemplary embodiment of the present inventive concept.

Referring to FIG. 1, a liquid crystal display 1000 according to the present exemplary embodiment includes a display area DA displaying an image and a peripheral area PA enclosing the display area DA. The display area DA occupies most of the liquid crystal display 1000. The peripheral area PA is a region where the image is not displayed, and is referred to as a non-display area or a bezel.

A plurality of pixels are disposed in the display area DA. The plurality of pixels includes a red pixel R, a green pixel G, a blue pixel B, and a white pixel W. The red pixel R, the green pixel G, the blue pixel B, and the white pixel W respectively includes a red color filter 230R, a green color filter 230G, a blue color filter 230B, and a white color filter 230W that are described later.

The red pixel R and the green pixel G are disposed to be adjacent in a first direction of an x-axis direction, and the red pixel R and the blue pixel B are disposed to be adjacent in a second direction of a y-axis direction. The blue pixel B and the white pixel W are disposed to be adjacent in the first direction, and the green pixel G and the white pixel W are disposed to be adjacent in the second direction. The red pixel R, the green pixel G, the blue pixel B, and the white pixel W are repeatedly disposed in the display area DA with the above arrangement structure.

Also, the liquid crystal display 1000 according to the present exemplary embodiment includes a plurality of reflective layers 165 reflecting external light including natural light. Each reflective layer 165 is disposed at the display area DA and the peripheral area PA. Each reflective layer 165 overlaps two pixels adjacent in the second direction and extends in the first direction. Each reflective layer 165 may receive a ground voltage or a common voltage in the peripheral area PA. The reflective layer 165 may include the conductive material having high reflectivity such as aluminum (Al), aluminum alloys, silver (Ag), silver alloys, molybdenum (Mo), and molybdenum alloys.

Next, a structure of the liquid crystal display according to the exemplary embodiment shown in FIG. 1 will be described with reference to FIG. 2 to FIG. 4.

Figure 2:
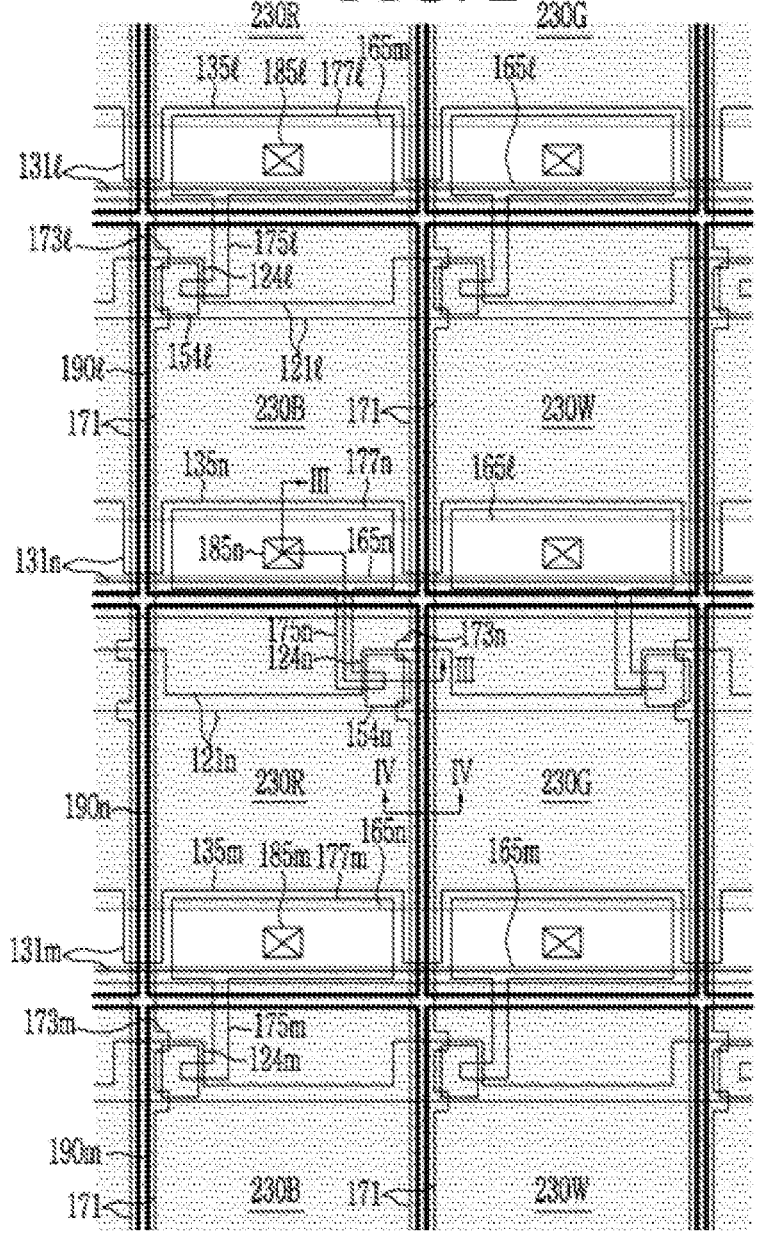
FIG. 2 is a view schematically showing an example of a partial pixel of the liquid crystal display according to FIG. 1.

FIG. 2 is a view schematically showing an example of a partial pixel of the liquid crystal display according to FIG. 1. FIG. 3 is a view schematically showing an example of a cross-section taken along a line of FIG. 2. FIG. 4 is a view schematically showing an example of a cross-section taken along a line IV-IV of FIG. 2.

Figure 3:
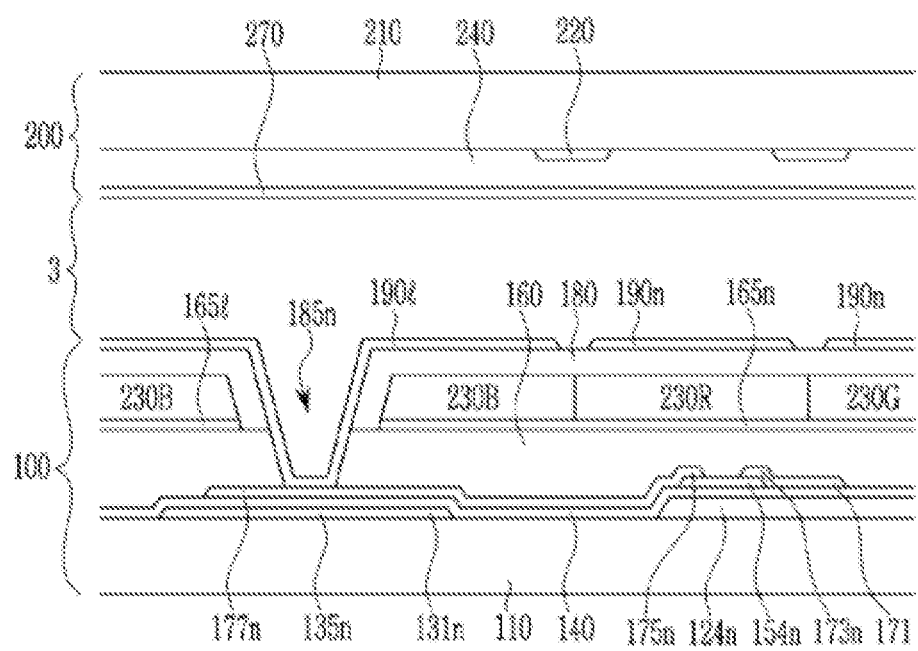
FIG. 3 is a view schematically showing an example of a cross-section taken along a line III-III of FIG. 2.
Figure 4:
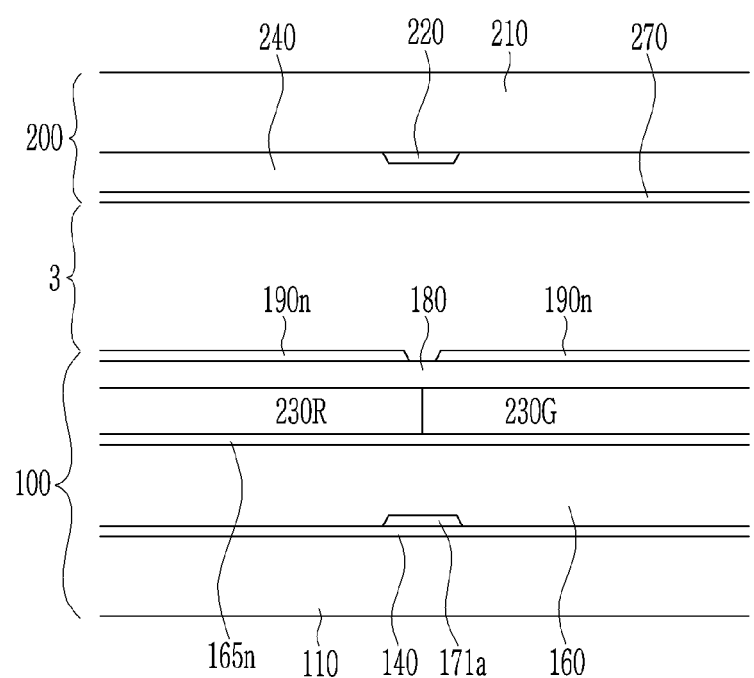
FIG. 4 is a view schematically showing an example of a cross-section taken along a line IV-IV of FIG. 2.

Referring to FIG. 2 to FIG. 4, the liquid crystal display according to the present exemplary embodiment includes a first display panel 100, a second display panel 200, and a liquid crystal layer 3 disposed between the first display panel 100 and the second display panel 200.

First, the first display panel 100 will be described.

A plurality of gate lines and a plurality of storage electrode lines are formed on a first substrate 110 formed of transparent glass, plastic, or the like. The plurality of gate lines and the plurality of storage electrode lines extend in the first direction as the x-axis direction. The plurality of gate lines and the plurality of storage electrode lines may include the conductive material having high reflectivity such as aluminum (Al), aluminum alloys, silver (Ag), silver alloys, molybdenum (Mo), and molybdenum alloys.

The plurality of gate lines transmits a gate signal to each pixel by receiving a gate signal from the outside, and include a first gate line 121*n*, a second gate line 121*l*, and a third gate line 121*m*. The second gate line 121*l* is separated from the first gate line 121*n* in the second direction of the y-axis direction on a plane, extends to be parallel to the first gate line 121*n*, and receives the gate signal earlier than the first gate line 121*n*. The third gate line 121*m* is separated from the first gate line 121*n* in the second direction, extends to be parallel to the first gate line 121*n* and the second gate line 121*l*, and receives the gate signal later than the first gate line 121*n*. The second gate line 121*l*, the first gate line 121*n*, and the third gate line 121*m* are sequentially disposed in the second direction.

The first gate line 121*n* includes a plurality of first gate electrodes 124*n* protruded from the first gate line 121*n* in the second direction. The second gate line 121*l* includes a plurality of second gate electrodes 124*l* protruded from the second gate line 121*l* in the second direction. The third gate line 121*m* includes a plurality of third gate electrodes 124*m* protruded from the third gate line 121*m* in the second direction.

The plurality of storage electrode lines receive the common voltage, and include first storage electrode lines 131*n* and third storage electrode lines 131*m*. The first storage electrode lines 131*n* are disposed between the first gate line 121*n* and the second gate line 121*l* on a plane, and are disposed to be close to the first gate line 121*n*. The third storage electrode lines 131*m* are disposed between the first gate line 121*n* and the third gate line 121*m* on a plane first, and are disposed to be close to the third gate line 121*m*.

The first storage electrode lines 131*n* include a plurality of first storage electrodes 135*n* protruded in the second direction. The third storage electrode lines 131*m* include a plurality of third storage electrodes 135*m* protruded in the second direction.

Also, the plurality of storage electrode lines further include second storage electrode lines (not shown) disposed above the second gate line 121*l* in the second direction on a plane. The second storage electrode lines are disposed to be close to the second gate lines 121*l*. The second storage electrode lines includes a plurality of second storage electrodes (not shown) protruded in the second direction.

A gate insulating layer 140 is disposed on the plurality of gate lines and the plurality of storage electrode lines. The gate insulating layer 140 may be made of a silicon oxide (SiOx). In the present exemplary embodiment, the gate insulating layer 140 is formed of a single-layered structure, however it is not limited thereto, and it may have a multi-layer structure including at least two insulating layers having different physical properties.

A plurality of semiconductor layers are disposed on the gate insulating layer 140. The plurality of semiconductor layers include a plurality of first semiconductor layers 154*n*, a plurality of second semiconductor layers 154*l*, and a plurality of third semiconductor layers 154*m*. Each first semiconductor layer 154*n* overlaps each first gate electrode 124*n*, each second semiconductor layer 154*l* overlaps each second gate electrode 124*l*, and each third semiconductor layer 154*m* overlaps each third gate electrode 124*m*.

A plurality of data lines and a plurality of drain electrodes are disposed on the plurality of semiconductor layers and the gate insulating layer 140. The plurality of data lines and the plurality of drain electrodes may include the conductive material having high reflectivity such as aluminum (Al), aluminum alloys, silver (Ag), silver alloys, molybdenum (Mo), and molybdenum alloys.

The plurality of data lines 171 include a plurality of first data lines 171*a* and a plurality of second data lines 171*b*. Each first data line 171*a* and each second data line 171*b* receive the data signal from the outside and transmit it to each pixel, and each first data line 171*a* and each second data line 171*b* extend in the second direction. Each first data line 171*a* and each second data line 171*b* include a plurality of source electrodes, and the plurality of source electrodes include a plurality of first source electrodes 173*n*, a plurality of second source electrodes 173*l*, and a plurality of third source electrodes 173*m*.

The first source electrode 173*n* overlaps the first gate electrode 124*n* and the first semiconductor layer 154*n*, the second source electrode 173*l* overlaps the second semiconductor layer 154*l* and the second gate electrode 124*l*, and the third source electrode 173*m* overlaps the third semiconductor layer 154*m* and the third gate electrode 124*m*.

The second source electrode 173*l* and the third source electrode 173*m* are protruded from each first data line 171*a* and each second data line 171*b* in the same direction, and the first source electrode 173*n* is protruded in the direction opposite to that of the second source electrode 173*l*.

The plurality of drain electrodes include a plurality of first drain electrodes 175*n*, a plurality of second drain electrodes 175*l*, and a plurality of third drain electrodes 175*m*.

The first drain electrode 175*n* faces the first source electrode 173*n* and overlaps the first semiconductor layer 154*n* and the first gate electrode 124*n*. The first drain electrode 175*n* includes a first storage capacitive plate 177*n* extending from the first drain electrode 175*n* and having a part in which an area overlapping the first storage electrode 135*n* is wide. Here, the first storage capacitive plate 177*n* and the first storage electrode 135*n* form a storage capacitor using the gate insulating layer 140 as a dielectric material.

The second drain electrode 175*l* faces the second source electrode 173*l* and overlaps the second semiconductor layer 154*l* and the second gate electrode 124*l*. The second drain electrode 175*l* includes a second storage capacitive plate (not shown) extending from the second drain electrode 175*l* and having a part in which an area overlapping the second storage electrode is wide. Here, the second storage capacitive plate and the second storage electrode form a storage capacitor using the gate insulating layer 140 as the dielectric material.

The third drain electrode 175*m* faces the third source electrode 173*m* and overlaps the third semiconductor layer 154*m* and the third gate electrode 124*m*. The third drain electrode 175*m* includes a third storage capacitive plate 177*m* extending from the third drain electrode 175*m* and having a part in which an area overlapping the third storage electrode 135*m* is wide. Here, the third storage capacitive plate 177*m* and the third storage electrode 135*m* form a storage capacitor using the gate insulating layer 140 as the dielectric material.

The first gate electrode 124*n*, the first semiconductor layer 154*n*, the first source electrode 173*n*, and the first drain electrode 175*n* form a first transistor. A channel region of the first transistor is formed in the first semiconductor layer 154*n* part between the first source electrode 173*n* and the first drain electrode 175*n*.

The second gate electrode 124*l*, the second semiconductor layer 154*l*, the second source electrode 173*l*, and the second drain electrode 175*l* form a second transistor. The channel region of the second transistor is formed in the second semiconductor layer 154*l* part between the second source electrode 173*l* and the second drain electrode 175*l*.

The third gate electrode 124*m*, the third semiconductor layer 154*m*, the third source electrode 173*m*, and the third drain electrode 175*m* form a third transistor. The channel region of the third transistor is formed in the third semiconductor layer 154*m* part between the third source electrode 173*m* and the third drain electrode 175*m*.

In one pixel column, the second transistor and the third transistor are connected to the second data line 171*b*, and the first transistor is connected to the first data line 171*a* from each other.

Ohmic contacts may be disposed between the first, second, and third semiconductor layers 154*n*, 154*l*, and 154*m* and the first, second, and third source electrodes 173*n*, 173*l*, and 173*m* and between the first, second, and third semiconductor layers 154*n*, 154*l*, and 154*m* and the first, second, and third drain electrodes 175*n*, 175*l*, and 175*m*.

A passivation layer 160 is disposed on the plurality of data lines, the plurality of drain electrodes, and the part of the first, second, and third semiconductor layers 154*n*, 154*l*, and 154*m* in which the channel region is formed. The passivation layer 160 may include an inorganic material such as a silicon nitride (SiNx) and a silicon oxide (SiOx), or an organic material. Also, the passivation layer 160 may have the multilayer structure including an inorganic material layer and an organic material layer.

A plurality of reflective layers are disposed on the passivation layer 160. The plurality of reflective layers include a first reflective layer 165*n*, a second reflective layer 165*l*, and a third reflective layer 165*m*. The first reflective layer 165*n*, the second reflective layer 165*l*, and the third reflective layer 165*m* respectively extend in the first direction and include the conductive material having high reflectivity such as aluminum (Al), aluminum alloys, silver (Ag), silver alloys, molybdenum (Mo), and molybdenum alloys.

The first reflective layer 165*n* covers the entire first gate line 121*n* and first transistor. Also, the first reflective layer 165*n* extends in the first direction and covers an entire width of a portion of the first data line 171*a* and the second data line 171*b*. Also, the first reflective layer 165*n* overlaps a part of the first storage capacitive plate 177*n* and a part of the third storage capacitive plate 177*m*.

The second reflective layer 165*l* covers the entire second gate line 121*l* and the second transistor. Also, the second reflective layer 165*l* extends in the first direction and covers the entire width of a portion of the first data line 171*a* and the second data line 171*b*. Further, the second reflective layer 165*l* overlaps a part of the first storage capacitive plate 177*n* and a part of the second storage capacitive plate (not shown).

The third reflective layer 165*m* covers the entire width of the third gate line 121*m* and the third transistor. Also, the third reflective layer 165*m* extends in the first direction and covers the entire width of a portion of the first data line 171*a* and the second data line 171*b*. Further, the third reflective layer 165*m* overlaps a part of the third storage capacitive plate 177*m* and a part of the storage capacitive plate (not shown) disposed under the third storage capacitive plate 177*m* in the second direction on a plane.

A plurality of color filters are disposed on the plurality of reflective layers. The plurality of color filters includes a red color filter 230R, a green color filter 230G, a blue color filter 230B, and a white color filter 230W.

The red color filter 230R and the green color filter 230G are disposed to be adjacent in the first direction, and the red color filter 230R and the blue color filter 230B are disposed to be adjacent in the second direction. The blue color filter 230B and the white color filter 230W are disposed to be adjacent in the first direction, and the green color filter 230G and the white color filter 230W are disposed to be adjacent in the second direction. The red color filter 230R, the green color filter 230G, the blue color filter 230B, and the white color filter 230W are repeatedly disposed with the above-described arrangement structure.

The red color filter 230R and the green color filter 230G are disposed on the first reflective layer 165*n*. Also, parts of the red color filter 230R and the green color filter 230G are disposed on the third reflective layer 165*m*.

On a plane, the blue color filter 230B and the white color filter 230W that are disposed above the red color filter 230R and the green color filter 230G disposed in the second direction are disposed above the second reflective layer 165*l*. Also, on a plane, the blue color filter 230B and the part of the white color filter 230W that are disposed above the red color filter 230R and the green color filter 230G in the second direction are disposed above the first reflective layer 165*n*.

On a plane, the blue color filter 230B and the white color filter 230W that are disposed under the red color filter 230R and the green color filter 230G in the second direction are disposed above the third reflective layer 165*m*. Also, on a plane, the blue color filter 230B and the part of the white color filter 230W that are disposed under the red color filter 230R and the green color filter 230G in the second direction are disposed above the reflective layer (not shown) disposed under the third reflective layer 165*m* in the second direction on a plane.

That is, in one pixel column, two color filters representing colors different from each other are disposed on one reflective layer.

An first overcoat 180 is disposed on the plurality of color filters. The first overcoat 180 includes the organic material, and an upper surface thereof may be flat.

The first overcoat 180 and the passivation layer 160 include a plurality of contact holes. The plurality of contact holes includes a first contact hole 185*n*, a second contact hole (not shown), and a third contact hole 185*m*. The first contact hole 185*n* overlaps the first storage capacitive plate 177*n*, and the third contact hole 185*m* overlaps the third storage capacitive plate 177*m*. Also, the second contact hole is disposed above the first contact hole 185*n* on a plane and overlaps the second storage capacitive plate (not shown).

A plurality of pixel electrodes are disposed on the first overcoat 180. The plurality of pixel electrodes are made of a transparent conductive material such as ITO (indium tin oxide) or IZO (indium zinc oxide), and include a first pixel electrode 190*n*, a second pixel electrode 190*l*, and a third pixel electrode 190*m*.

The pixel electrode overlaps one color filter. For example, referring to FIG. 2, the first pixel electrode 190*n* overlaps the red color filter 230R, and the second pixel electrode 190*l* overlaps the blue color filter 230B disposed above the red color filter 230R in the second direction on a plane. The third pixel electrode 190*m* overlaps the blue color filter 230B disposed under the red color filter 230R in the second direction on a plane.

The first pixel electrode 190*n* overlaps the first gate line 121*n* and the first transistor, and is connected to the third storage capacitive plate 177*m* through the third contact hole 185*m*. The third storage capacitive plate 177*m* extends from the third drain electrode 175*m* such that the first pixel electrode 190*n* is connected to the third transistor.

The second pixel electrode 190*l* overlaps the second gate line 121*l* and the second transistor, and is connected to the first storage capacitive plate 177*n* through the first contact hole 185*n*. The first storage capacitive plate 177*n* extends from the first drain electrode 175*n* such that the second pixel electrode 190*l* is connected to the first transistor.

The third pixel electrode 190*m* overlaps the third gate line 121*m* and the third transistor, and is connected to the storage capacitive plate (not shown) disposed under the third storage capacitive plate 177*m* on a plane through the contact hole (not shown) disposed under the first contact hole 185*n* on a plane. On a plane, the storage capacitive plate disposed under the third storage capacitive plate 177*m* extends from the drain electrode (not shown) disposed under the third drain electrode 175*m* on a plane such that the third pixel electrode 190*m* is connected to the transistor disposed under the third transistor on a plane.

As above-described, the pixel electrode according to the present exemplary embodiment is connected to the transistor disposed downward in the second direction on a plane as well as the overlapped transistor.

In general, the transistor is turned on such that the voltage applied to the pixel electrode must be maintained even if the transistor is turned subsequently off; however, the voltage applied to the pixel electrode is distorted by a parasitic capacitance between the gate electrode and the source/drain electrodes of the transistor. Also, the parasitic capacitance generated by the overlapping of the gate line and the pixel electrode is further added such that the distortion of the voltage applied to the pixel electrode is non-negligible.

In the present exemplary embodiment, however, as each pixel electrode is connected to the transistor disposed at the following row in the second direction on a plane as well as the overlapped transistor, even if the transistor enters the turned-on state, since the voltage is not applied to the overlapped pixel electrode, the distortion of the voltage applied to the pixel electrode due to the parasitic capacitance by the overlapping of the transistor and the gate line, and the pixel electrode, may be prevented.

Also, in the present exemplary embodiment, the reflective layer is disposed between the gate line and the data line, and the pixel electrode. The reflective layer prevents the coupling generated by the gate line and the data line, and the pixel electrode.

Also, in the present exemplary embodiment, the reflective layer extends in the first direction, thereby covering the data line. The storage capacitive plate is disposed between the reflective layers such that the storage capacitive plate has a function of the reflective layer. Accordingly, the reflectivity of the liquid crystal display 1000 may be improved.

Further, in the present exemplary embodiment, the color filter and the overcoat are disposed between the pixel electrode and the reflective layer such that the capacitance generation between the pixel electrode and the reflective layer may be reduced.

Hereinafter, the second display panel 200 will be described.

A common electrode 270 is disposed between a second substrate 210 made of the transparent glass or plastic and the liquid crystal layer 3. An second overcoat 240 and a light blocking layer 220 are disposed between the common electrode 270 and the second substrate 210. The second overcoat 240 covers the light blocking layer 220. The light blocking layer 220 is disposed corresponding to an area where the color filters representing the colors different from each other are in contact with each other. That is, the light blocking layer 220 is disposed corresponding to the first data line 171*a* and between the pixel electrodes in the second direction. Also, the light blocking layer 220 may be disposed corresponding to the second data line 171*b*.

On the other hand, the light blocking layer may be included in the first display panel rather than the second display panel. A structure in which the light blocking layer is included in the first display panel will be described with reference to FIG. 5.

Figure 5:
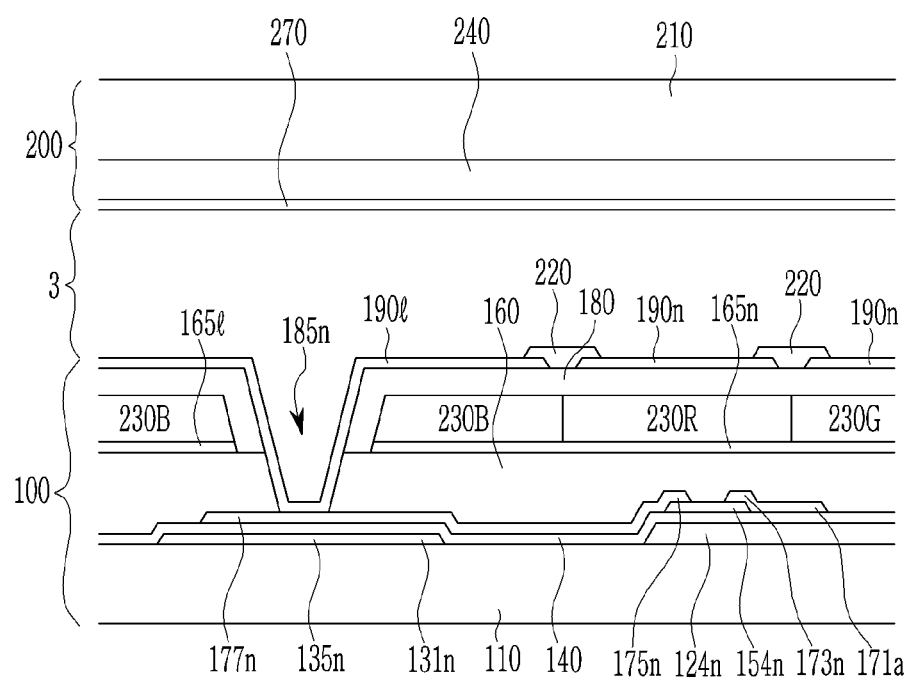
FIG. 5 is a view is a view schematically showing an example of a cross-section of a liquid crystal display according to another exemplary embodiment of the present inventive concept.

FIG. 5 is a view schematically showing an example of a cross-section of a liquid crystal display according to another exemplary embodiment of the present inventive concept.

Referring to FIG. 5, the liquid crystal display according to the present exemplary embodiment has the same structure as the liquid crystal display according to FIG. 1 except for the position of the light blocking layer 220. Accordingly, the description of the same structure is omitted.

The light blocking layer 220 is disposed on the first overcoat 180 between the first pixel electrode 190*n* and the second pixel electrode 190*l*, and one the part of the first pixel electrode 190*n* and the part of the second pixel electrode 190*l*. Also, the light blocking layer 220 is disposed on the first overcoat 180 of the part corresponding to the data line 171 and the first pixel electrode 190*n* of the part corresponding to the first data line 171*a*. Also, the light blocking layer 220 may be disposed corresponding to the second data line 171*b*. Accordingly, the light blocking layer 220 is disposed corresponding to the part where the color filters representing the different colors from each are in contact with each other.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

121*n*, 121*l*, 121*m*: first, second, third gate line
124*n*, 124*l*, 124*m*: first, second, third gate electrode
131*n*, 131*m*: first, third storage electrode lines
135*n*, 135*m*: first, third storage electrode
154*n*, 154*l*, 154*m*: first, second, third semiconductor layer
165*n*, 165*l*, 165*m*: first, second, third reflective layer
171*a*, 171*b*: first and second data line
173*n*, 173*l*, 173*m*: first, second, third source electrode
175*n*, 175*l*, 175*m*: first, second, third drain electrode
177*n*, 177*m*: first, second storage capacitive plate
190*n*, 190*l*, 190*m*: first, second, third pixel electrode

What is claimed is:

1. A liquid crystal display comprising:
a first substrate;
a first gate line disposed on the first substrate and extending in a first direction;
a second gate line disposed on the first substrate, extending in the first direction, and disposed above the first gate line in a second direction on a plane, the second direction perpendicular to the first direction;
a first data line and a second data line disposed on the first substrate, insulated from the first gate line and the second gate line, the first data line and the second data line disposed to be close to each other;
a first transistor connected to the first gate line and the first data line;
a second transistor connected to the second gate line and the second data line;

a first pixel electrode overlapping the first transistor and the first gate line;

a second pixel electrode overlapping the second transistor and the second gate line; and a first reflective layer disposed on the first gate line, the first data line, and the second data line and disposed under the first pixel electrode, and extending in the first direction, wherein the first pixel electrode is disposed under the second pixel electrode in the second direction on a plane, and the first transistor is connected to the second pixel electrode.

2. The liquid crystal display of claim 1, wherein the first reflective layer covers an entirety of the first gate line and the first transistor and covers an entire width of a portion of the first data line and an entire width of a portion of the second data line.

3. The liquid crystal display of claim 2, further comprising a second reflective layer disposed on the first data line and the second data line, and disposed under the second pixel electrode, and extending in the first direction.

4. The liquid crystal display of claim 3, wherein the second reflective layer covers an entirety of the second gate line and the second transistor, and covers an entire width of a portion of the first data line and an entire width of a portion of the second data line.

5. The liquid crystal display of claim 4, further comprising:

a third gate line disposed on the first substrate and disposed under the first gate line in the second direction on a plane;

a third transistor connected to the third gate line and the second data line; and a third pixel electrode overlapping the third gate line and the third transistor and disposed under the first pixel electrode in the second direction on a plane.

6. The liquid crystal display of claim 5, wherein the first pixel electrode is connected to the third transistor.

7. The liquid crystal display of claim 6, further comprising a third reflective layer disposed on the third gate line, the first data line, and the second data line and, disposed under the third pixel electrode, and extending in the first direction.

8. The liquid crystal display of claim 7, wherein the third reflective layer covers an entirety of the third gate line and the third transistor and covers an entire width of a portion of the first data line and an entire width of a portion of the second data line.

9. The liquid crystal display of claim 8, wherein a boundary of the first pixel electrode and the second pixel electrode overlaps the first reflective layer, and a boundary of the first pixel electrode and the third pixel electrode overlaps the third reflective layer.

10. The liquid crystal display of claim 9, further comprising:

a first storage electrode line disposed on the first substrate and disposed between the first gate line and the second gate line on a plane; and a third storage electrode line disposed on the first substrate and disposed between the first gate line and the third gate line on a plane.

11. The liquid crystal display of claim 10, wherein the first storage electrode line includes a first storage electrode protruded in the second direction on a plane, and the third storage electrode line includes a third storage electrode protruded in the second direction on a plane.

12. The liquid crystal display of claim 11, wherein a drain electrode of the first transistor includes a first storage capacitive plate overlapping the first storage electrode, and the drain electrode of the third transistor includes a third storage capacitive plate overlapping the third storage electrode.

13. The liquid crystal display of claim 12, wherein the first pixel electrode is connected to the third storage capacitive plate, and the second pixel electrode is connected to the first storage capacitive plate.

14. The liquid crystal display of claim 13, wherein the boundary of the first reflective layer and the second reflective layer overlaps the first storage capacitive plate, and the boundary of the first reflective layer and the third reflective layer overlaps the third storage capacitive plate.

15. The liquid crystal display of claim 14, wherein the first reflective layer, the second reflective layer, the third reflective layer, the first storage capacitive plate, and the third storage capacitive plate include the same material.

16. The liquid crystal display of claim 15, further comprising:

a first color filter disposed between the first pixel electrode and the first reflective layer; and a second color filter disposed between the second pixel electrode and the first reflective layer, and the first color filter and the second color filter represent different colors from each other.

17. The liquid crystal display of claim 16, wherein the first substrate includes a display area displaying an image and a peripheral area enclosing the display area, the first reflective layer, the second reflective layer, and the third reflective layer are disposed at the display area and the peripheral area, and the first reflective layer, the second reflective layer, and the third reflective layer receive a ground voltage or a common voltage at the peripheral area.

* * * * *